(No Model.) 2 Sheets—Sheet 1.

L. D. HURD.
WAGON RUNNING GEAR.

No. 318,906. Patented May 26, 1885.

Witnesses:
Geo. E. Pitman
Theo. L. Popp

L. D. Hurd Inventor.
By Whelen & Bonner
Attorneys.

(No Model.) 2 Sheets—Sheet 2.
L. D. HURD.
WAGON RUNNING GEAR.
No. 318,906. Patented May 26, 1885.
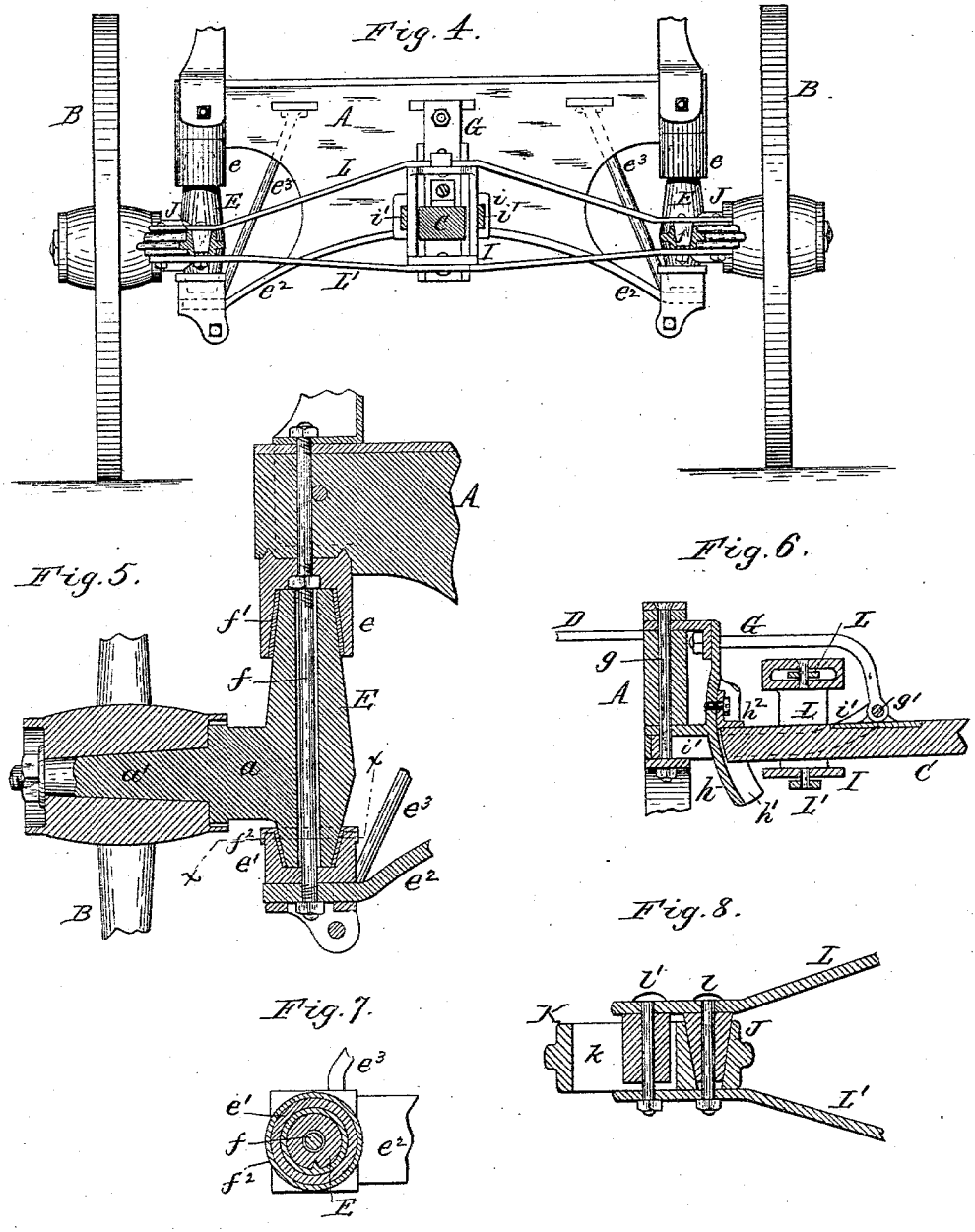

UNITED STATES PATENT OFFICE.

LORENZO DOW HURD, OF WELLSVILLE, ASSIGNOR OF ONE-THIRD TO JOSEPH C. SAMPSON, OF ELMIRA, NEW YORK.

WAGON RUNNING-GEAR.

SPECIFICATION forming part of Letters Patent No. 318,906, dated May 26, 1885.

Application filed December 10, 1884. (No model.)

*To all whom it may concern:*

Be it known that I, LORENZO D. HURD, of Wellsville, in the county of Allegany and State of New York, have invented new and useful Improvements in Wagons, of which the following is a specification.

This invention relates to an improvement in that class of wagons in which the forward wheels are mounted upon short disconnected axles, which are pivoted separately to the frame and so connected with the tongue that upon turning the latter both forward axles are turned in the same direction and to the same extent, thereby keeping the forward wheels at all times parallel with each other. With this arrangement of running-gear the forward wheels drag in turning the wagon, because the wheels tend to travel in different circles, or circles whose centers lie in two different lines, one behind the other, and not in the same line.

One object of my invention is to prevent this dragging of the forward wheels, and this I accomplish by turning the inner wheel more than the outer wheel, so that the axial lines of the two wheels intersect each other.

My invention has the further object to improve the construction of the running-gear in various other respects; and my invention consists, to these ends, in the improvements in the construction of the running-gear, which will be hereinafter fully set forth, and pointed out in the claims.

Figure 1:
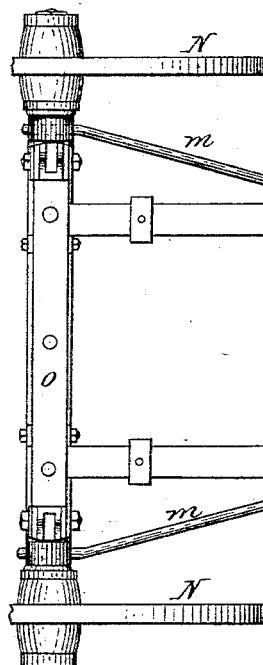
Figure 2:
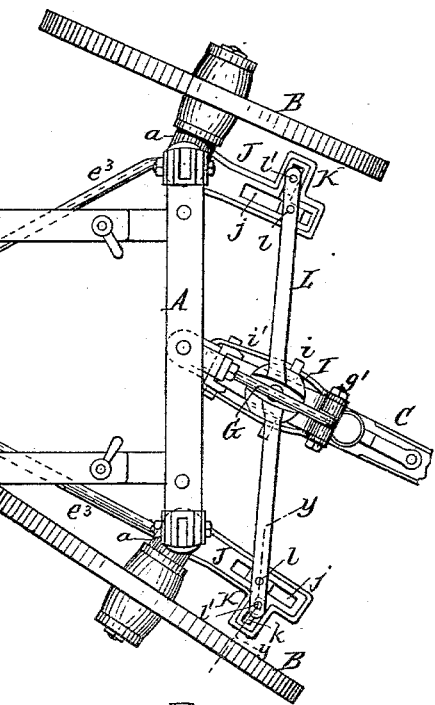
Figure 2:
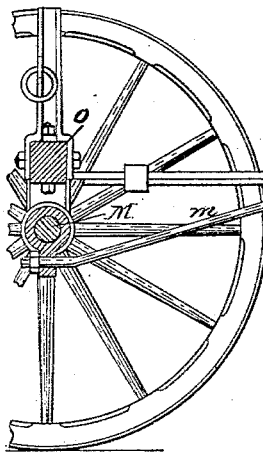
Figure 3:
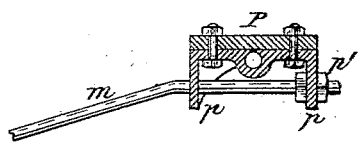

In the accompanying drawings, consisting of two sheets, Figure 1 is a top plan view of my improved running-gear. Fig. 2 is a longitudinal sectional elevation thereof. Fig. 3 is a longitudinal section, on an enlarged scale, showing the connection of the rear braces with the reach. Fig. 4 is a transverse sectional elevation of the forward part of the running-gear. Fig. 5 is a sectional elevation of one of the front axles. Fig. 6 is a sectional elevation of the rear portion of the tongue. Fig. 7 is a horizontal section in line $x\,x$, Fig. 5. Fig. 8 is a vertical section on an enlarged scale in line $y\,y$, Fig. 1.

Like letters of reference refer to like parts in the several figures.

A represents the forward axle-frame; $a\,a$, the forward axles; B, the forward wheels, mounted on spindles $a'$ of said axles; C, the tongue, and D D the reach.

E E are vertical spindles, formed at the inner ends of the axles $a$, and seated with their upper ends in bearings $e$, secured to the axle-frame A, and with their lower ends in bearings $e'$, attached to braces $e^2$, which are secured to the axle-frame A.

$f$ is a vertical bolt, extending through the spindle E, bearings $e\,e'$, axle-frame A, and brace $e^2$, and securing the parts together. The upper and lower ends of each spindle E are made tapering.

$f'\,f^2$ are removable linings, of brass or other suitable metal, placed in the bearings $e\,e'$ and receiving the wear of the parts. The spindles E support the weight resting on the axle-frame A, and the braces $e^2$ serve, principally, to hold the lower ends of the spindles in position. The spindles E turn in the bearings $e\,e'$, whereby the position of the axles $a$ and wheels B is adjusted. $e^3$ are inclined braces, connecting the ends of the braces $e^2$ with the reach.

G represents a frame, which is pivoted to the axle-frame A by a vertical bolt, $g$, and to which the rear end of the tongue C is pivoted by a horizontal bolt, $g'$, so that the tongue can swing in a vertical plane on the bolt $g'$ and in a horizontal plane on the bolt $g$. The frame G is provided with a guide-segment, $h$, having on its front side guide-flanges $h'$, between which the rear end of the tongue C plays in swinging on the bolt $g'$, whereby the rear end of the tongue is held against lateral movement in the frame G. The segment $h$ is provided with a stop, $h^2$, which limits the upward movement of the rear end of the tongue.

I is a loop or open frame, which surrounds the rear end of the tongue C, between the bolt $g'$ and the segment $h$.

$i$ are side loops, formed on the frame I, and $i'$ are side bars, extending from the bolt $g'$ to the segment $h$ and passing through the side loops, $i$. The bars $i'$ serve to hold the lower end of the segment $h$ and the bolt $g'$ in their proper relative positions.

J are forwardly-projecting arms, formed on the axle $a$ and provided with longitudinal slots $j$.

K are lateral extensions, formed on the outer sides of the arms J and provided with lateral slots k.

L L' are cross-bars, pivoted, respectively, to the upper and lower sides of the loop-frame I, and connected with the arms J by bolts l l' and suitable sliding blocks arranged, respectively, in the slots j and k of the arms J. Upon turning the tongue C the movement of the tongue is transmitted to the arms J by the cross-bars L L'. The connecting-bolt l, on the arm J of the inner wheel, slides backward in the slot j as the tongue is turned, and the bolt l, on the arm of the outer wheel, slides forward at the same time, whereby the inner arm, J, is turned through a greater arc than the outer arm by the same movement of the tongue. The inner wheel, B, is consequently turned more than the outer wheel, as represented in Fig. 1, whereby the wheels are placed in a position in which the axial lines are not parallel, but intersect each other, the inner wheel turning in a smaller circle than the outer wheel. This position of the wheels in turning prevents dragging or springing of the wheels and greatly reduces the power required for drawing the vehicle in turning it.

M represents the rear axle, N N the rear wheels, and O the rear bolster.

m are inclined braces, connecting the ends of the rear axle, M, with a cross-piece, P, which is secured to the reach D. The cross-piece P is provided near its ends with supports or brackets p, to which the front ends of the braces m are adjustably attached by screw-nuts p', so that by turning the latter the braces m can be adjusted forwardly or backwardly. This affords means for correcting any slight inaccuracies in the position of the rear axle and wheels.

I claim as my invention—

1. The combination, with the tongue and front axles, pivoted separately to a supporting-frame and provided with actuating-arms, of a cross-piece moving laterally with the tongue in turning the same and connected with said actuating-arms by a shifting connection, whereby the operative lengths of the arms is made unequal in turning the tongue, thereby causing one axle to be turned more than the other by the same movement of the tongue, substantially as set forth.

2. The combination, with the axle-frame A and pivoted axles a, provided with arms J, having slots j and k, of the tongue C, cross-bars L L', and bolts l l', connecting the cross-bars with the slotted arms J, substantially as set forth.

3. The combination, with the axle-frame A and pivoted axles a, provided with slotted arms J, of the tongue C, frame I, surrounding the tongue, frame G, supporting the frame I, and cross-bars L L', pivoted to the frame I and connecting with the slotted arms J, substantially as set forth.

4. The combination, with the rear axle, M, and reach D, of the cross-piece P, secured to the reach, bracket p, secured to said cross-piece, and braces m, secured with their rear ends to the axle and adjustably attached with their front ends to the brackets p, substantially as set forth.

LORENZO DOW HURD.

Witnesses:
ELBERT O. SCOTT,
ANDREW WATSON.